(12) United States Patent
Ambartsoumian

(10) Patent No.: US 10,762,308 B1
(45) Date of Patent: Sep. 1, 2020

(54) METHOD AND SYSTEM FOR WIRELESS IDENTIFICATION OF SAMPLES IN CRYOGENIC LIQUID STORAGE

(71) Applicant: Gourgen Ambartsoumian, Laval (CA)

(72) Inventor: Gourgen Ambartsoumian, Laval (CA)

( * ) Notice: Subject to any disclaimer, the term of this patent is extended or adjusted under 35 U.S.C. 154(b) by 18 days.

(21) Appl. No.: 16/034,597

(22) Filed: Jul. 13, 2018

Related U.S. Application Data

(60) Provisional application No. 62/531,941, filed on Jul. 13, 2017.

(51) Int. Cl.
*G06K 7/08* (2006.01)
*G06K 7/10* (2006.01)
*G06K 19/07* (2006.01)

(52) U.S. Cl.
CPC ..... *G06K 7/10297* (2013.01); *G06K 7/10316* (2013.01); *G06K 19/0702* (2013.01); *G06K 19/0709* (2013.01)

(58) Field of Classification Search
CPC ........... G06K 7/10297; G06K 7/10316; G06K 19/0702; G06K 19/0709
USPC ......................................... 235/451, 380, 375
See application file for complete search history.

(56) References Cited

U.S. PATENT DOCUMENTS

| 8,887,944 B2* | 11/2014 | Deane | B65D 81/3802 206/499 |
|---|---|---|---|
| 2015/0205986 A1* | 7/2015 | Morris | G06K 19/07762 235/439 |
| 2018/0368394 A1* | 12/2018 | Kjelland | A01N 1/0268 |

\* cited by examiner

*Primary Examiner* — Karl D Frech
(74) *Attorney, Agent, or Firm* — Norton Rose Fulbright Canada LLP

(57) ABSTRACT

A system for wireless identification of samples in a tank holding cryogenic liquid in cryogenic liquid storage comprises wireless tags adapted to be connected to a container of the sample in the cryogenic liquid. The wireless tags have an identification associated to the sample in the container. A wireless reader is adapted to be located outside of the tank and operable to obtain and output the identification of the at least one wireless tag via wireless communication and through the cryogenic liquid. A method of wireless identification of samples in cryogenic liquid storage is also provided.

16 Claims, 2 Drawing Sheets

METHOD AND SYSTEM FOR WIRELESS IDENTIFICATION OF SAMPLES IN CRYOGENIC LIQUID STORAGE

CROSS-REFERENCE TO RELATED APPLICATION

The present application claims the priority of U.S. Patent Application No. 62/531,941, filed on Jul. 13, 2017 and incorporated herein by reference.

TECHNICAL FIELD

The present application relates to wireless identification of samples in cryogenic liquid storage, such as liquid nitrogen storage.

BACKGROUND OF THE ART

It is known to store biological samples in cryogenic liquids such as liquid nitrogen due to the cryogenic conditions that preserve the integrity of the biological samples. In liquid nitrogen storage, samples are received in any appropriate container and immersed in a bath of liquid nitrogen stored in a tank.

Due to the cold temperature, the tanks are typically made of robust insulating material. Accordingly, for the various samples to be identified, it may be required to open the tank, to remove racks supporting cryo boxes or canisters containing vials from the tank. However, the opening of the tank, and the handling of the samples in and out of the tank expose the samples to a warmer temperature and cause evaporation of liquid nitrogen among other things. It is known to keep a list of samples per tank, with the occasional surveying of the samples by the opening of the storage tank, and with the possible removal from the storage tank, but this requires that the list be updated for every movement of samples. In parallel, technologies that could assist in automating the identification, such as wireless identification technologies, have not been used in liquid nitrogen storage due to the incapacity of such wireless identification systems to communicate with wireless tags through the tank walls, and/or through the liquid phase of nitrogen, or like liquefied cryogenic refrigerants.

SUMMARY

It is therefore an aim of the present disclosure to provide a method for wireless identification of samples in cryogenic liquid storage that addresses issues related to the prior art.

It is a further aim of the present disclosure to provide a system for wireless identification of samples in cryogenic liquid storage that addresses issues related to the prior art.

Therefore, in accordance with the present disclosure, there is provided a system for wireless identification of samples in a tank holding cryogenic liquid in cryogenic liquid storage comprising: at least one wireless tag adapted to be connected to a container of the sample in the cryogenic liquid, the at least one wireless tag having an identification associated to the sample in the container; and a wireless reader adapted to be located outside of the tank and operable to obtain and output the identification of the at least one wireless tag via wireless communication and through the cryogenic liquid.

In accordance with further embodiment of the present disclosure, there is provided a method of wireless identification of samples in cryogenic liquid storage comprising: emitting at least one wireless signal for same to travel through a cryogenic liquid in a cryogenic storage tank; wirelessly receiving the wireless signal after it has travelled through the cryogenic liquid; and identifying a sample associated to the radio frequency signal.

DETAILED DESCRIPTION

Figure 1:
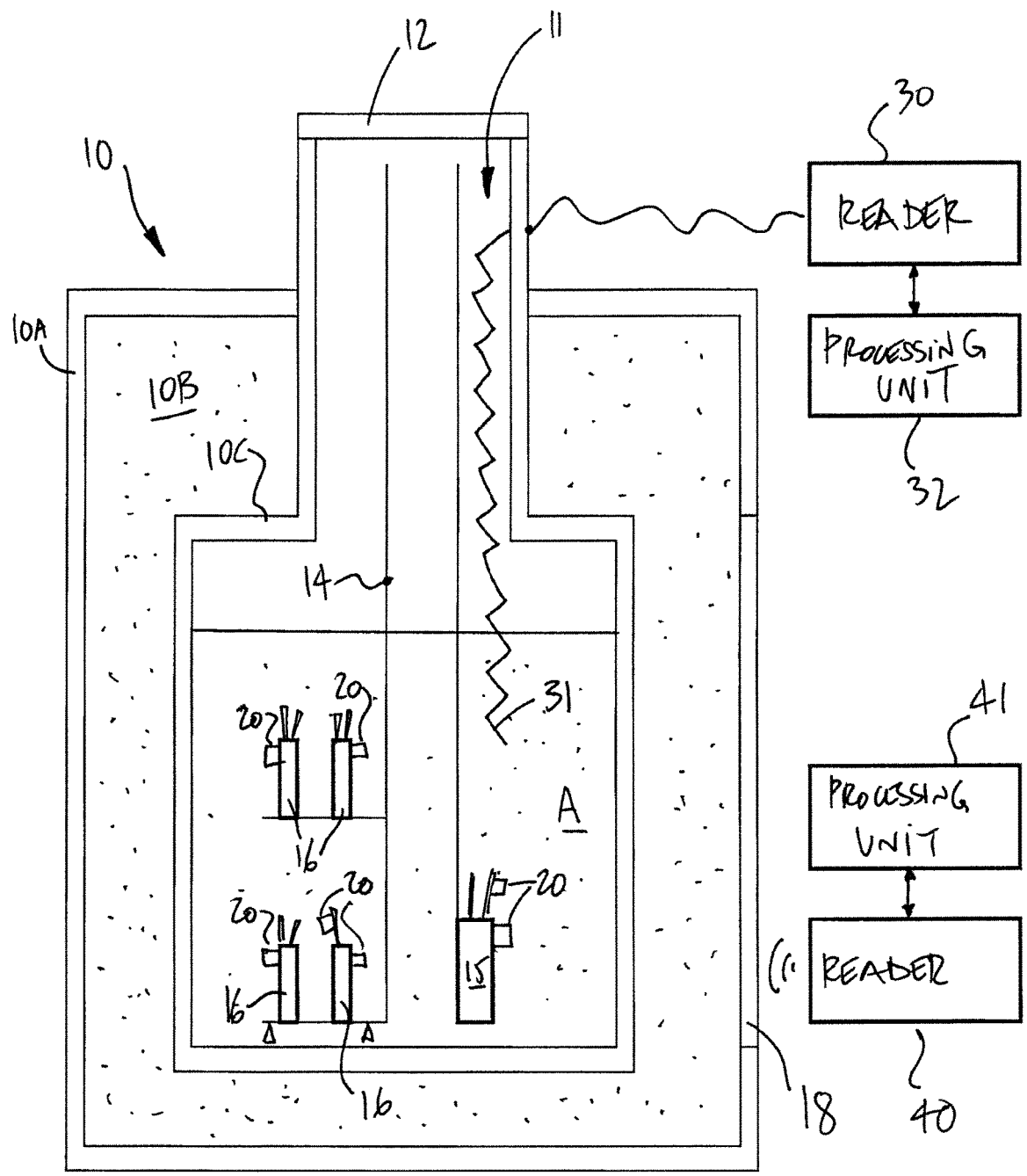
FIG. 1 is a schematic view of a system for wireless identification of samples in liquid nitrogen storage in accordance with an embodiment of the present disclosure.

Referring to drawings and more particularly to FIG. 1, there is shown a tank 10 that is used for cryogenic liquid storage. For example, the liquid may be any appropriate liquefied gas used for providing cryogenic cooling, such as liquid nitrogen or liquid helium. Cryogenic liquids are liquefied gases maintained in their liquid state at very low temperatures. Cryogenic liquids may have boiling points below −238° F., although some cryogenic liquids may have higher boiling points, such as carbon dioxide and nitrous oxide. Cryogenic liquids are gases at ambient temperatures and pressures, and these gases must be cooled below ambient temperature before a pressure increase may result in the gases liquefying. As liquid nitrogen is commonly used for cryogenic storage, reference is made herein to liquid nitrogen, although other cryogenic liquids may also be used. For simplicity, the tank 10 is shown schematically, and may have multiple components not shown in the FIG. 1, for simplicity. The tank 10 is of the type having a shell 10A made of a robust material such as metal or structural polymer, the shell 10A enclosing insulation 10B, with a liner 100 forming an inner cavity in which liquid nitrogen is received. The liner 100 is for example made from a polymer, thermoplastic or a thermoset material, composite materials and may include certain areas made of metal. Other possible constituents of the tank 10 include adsorbents, seal joints, handle, etc.

Accordingly, the tank 10 is configured to receive a cryogenic liquid such as liquid nitrogen A in its inner cavity, and insulate the cryogenic liquid from ambient, to preserve the liquid phase of the cryogenic refrigerant, and/or slow down its evaporation. The tank 10 may also be known as container, Dewar, vacuum flask, reservoir, etc. Although the nitrogen is shown in a liquid phase in FIG. 1, some vapour nitrogen may also be present above the liquid level due to evaporation. A passage or gooseneck 11 may project upwardly from the cavity of the tank and defines an opening through which the interior of the tank 10 may be accessed. The opening of the tank 10 is kept shut by a cover plug 12 (a.k.a., lid) that is sealingly connected to the tank 10 in order to keep the liquid nitrogen therein. Capping, although not shown, may further protect the cover plug 12. The shape of the tank 10 with gooseneck is one configuration among others. For example, the tank 10 may have an open-ended cylindrical shape, among other possible configurations.

Figure 2:
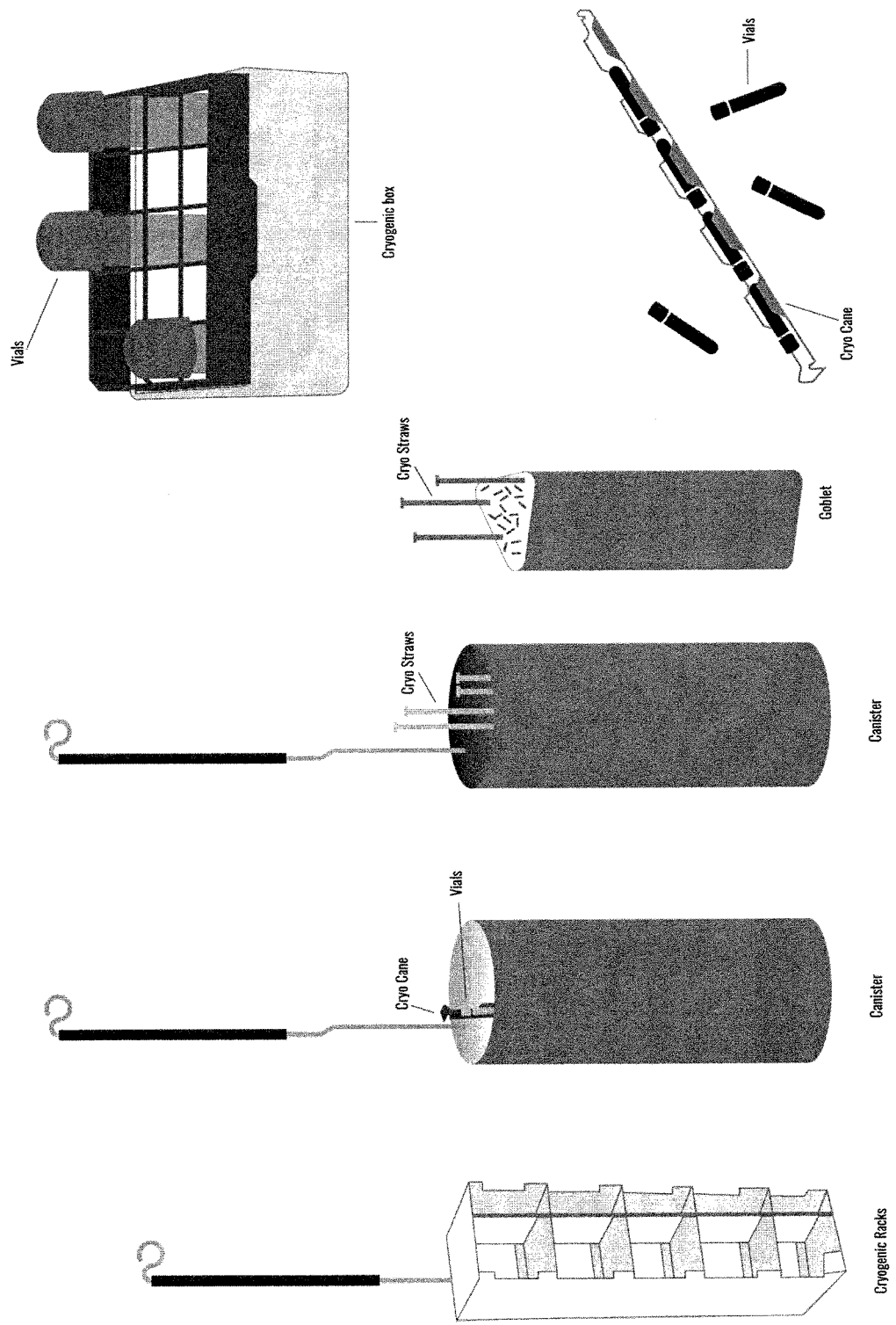
FIG. 2 is a schematic view of hardware that may be used in cryogenic liquid storage, and that may be used to store samples to be identified by the system for wireless identification of FIG. 1.

A rack 14 or pails (a.k.a., canisters) 15 are typically provided inside the tank 10. The rack 14 supports a plurality of containers 16 enclosing samples of biological material. The rack 14 and pails 15 are only schematically shown in FIG. 1. FIG. 2 shows a variety of different components that may be used with the system of the present disclosure, and hence be located in the tank 10 for cryogenic storage and wireless identification. These include cryogenic racks, canisters with cryo canes supporting vials and cryo straws, goblets supporting cryo straws, and cryogenic boxes supporting vials, with any of these supporting a wireless tag 20. Pails or canisters 15 usually contain a plurality of samples such as cryogenic straws and sample canes. Cryo straws are placed inside plastic goblets which are placed inside a canister. Cryo canes are made of metal (aluminum), and the vials are snapped on the canes and the canes are placed inside the canister. All of these components may be made in non-metallic materials (e.g., polymers and plastics) to facilitate wireless communication. In FIG. 1, a few samples are shown, but it is contemplated to have numerous containers 16 of samples on various levels of the rack 14. As is convention, the rack 14 has a top handle that projects above the liquid line of the nitrogen so as to manipulate the rack 14 with containers of samples 16 thereon out of the liquid nitrogen tank 10. The pails 15 each support individual samples of biological material or a plurality thereof. Other storage equipment may be used as well, including vials stored in cryo boxes, and supported by the shelves of the rack 14, cryogenic straws in pails 15, etc. According to an embodiment, a window 18 of sufficient size may be provided in the shell 10A of the tank 10, which window 18 is made of a material such as a polymer, etc, in contrast to the metal of a remainder of the shell 10A. Alternatively, as mentioned above, the shell 10A may consist of a structural polymer, such that the tank 10 is not structurally made of metal.

According to an embodiment, each of the pails 15 and/or containers 16 of samples is provided with the wireless tag 20. In an embodiment, the wireless tag 20 is a RFID tag (Radio Frequency Identification Tag). As detailed hereinafter, the RFID tags may be passive tags, as passive tags produce sufficient signal strength for cryogenic use. However, active tags, battery-assisted passive tags may be used as well, depending on the reader that is used. Each wireless tag 20 has an identity that is associated to the sample enclosed by the pail 15/container 16 to which the wireless tag 20 is connected. According to an embodiment, each wireless tag 20 has a unique identity via an internal serial number. It is possible to have a plurality of vials aliquoted with a same sample and therefore possible to have copies of the same sample which are not uniquely identified, each may have a respective wireless tag 20. The wireless tag 20 may be adhered to the containers 16, such as with an adhesive (e.g., adhesive label including the tag 20) or other connection arrangement for example as a label, or may be attached or incorporated onto or into a container itself (not as a pressure sensitive label). The wireless tag 20 may or may not be embedded in protective material and connected to or placed in the container 16. It is also contemplated to use other types of wireless tags, such as Near Field Communication tags (NFC), Bluetooth®, among other possibilities.

Referring to FIG. 1, a reader is generally shown at 30 and is of the type that is dedicated to reading the wireless tags 20. Therefore, the reader 30 is an RF reader if the wireless tags are RFIDs. Moreover, depending on the nature of the wireless tags 20, such as active, battery-assisted passive, or passive, the reader 30 is equipped with appropriate signal-emitting or receiving capacity as a function of the nature of the wireless tag 20. Possible examples of RFID reader technology may be Alien Technology, Harting Technology Group, for example. Samples of RFID Tags include ones from Alien Technology, SML, Laxcen Technology, Impinj, etc. The combination of wireless tags 20 and reader 30 may operate in a high frequency range (3 to 30 MHz, with known HF of 13.56 MHz well suited for cryogenic use), or ultra-high frequency range (e.g., 300 MHz to 3 GHz, with band of 856-960 MHz well suited for cryogenic use), although other frequency ranges are also covered. According to an embodiment, an antenna 31 is connected to the reader 30 and projects into the tank 10 to be in proximity to the samples 16 and wireless tags 20, and therefore bathes in the liquid nitrogen A. The antenna 31 may have different shapes or formats, such as a wire, a cable, a flexible or a rigid plate, to name a few examples. In spite of having the antenna 31 in the tank 10, liquid or vapour nitrogen separates the antenna 31 from the wireless tags 20. However, the presence of the antenna 31 within the tank 10 allows wireless communication between the tags 20 and the antenna 31, through liquid or vapour nitrogen. Therefore, the reader 30 may receive signals from the antenna 31 and provide an identification of the tag 20. The reader 30 may further include a processor unit 32 with database or network connectivity that will run the identification provided by the reader 30 against a database of samples that has previously been programmed to relate the identification of the wireless tags 20 to the content of the samples 16.

According to another embodiment, the reader is shown at 40 and does not have an antenna projecting into the tank 10. It is however placed in proximity to the window 18 for wireless signals to pass through the window 18, the window 18 being sized for direct sight between the reader 40 and tags 20. Alternatively, if the shell 10A is made of a structural polymer, a wireless communication can be established between the wireless tags 20 and the reader 40 if the tank 10 and reader 40 are placed within the appropriate range. Accordingly, the reader 40 has the capacity of obtaining signals pertaining to the wireless tags 20 in spite of being separated from the samples and wireless tags 20 by the liquid nitrogen, through the window 18 in the shell 10A or the non-metallic material of the shell 10A of the tank 10. The window 18 constitutes a discontinuity in the wall of the tank 10 through which the reader 40 may obtain a signal of the wireless tag 20. The reader 40 may simply provide the identification of the wireless tag 20, or may include a processor unit 41 through which a full identity of the biological sample may be obtained. In an embodiment, the antenna 31 is installed as a bottom plate of the tank 10. The reader 30 and antenna 31 may be integrated together in such a bottom plate. As yet another embodiment, each rack 14 or pail 15 may have its own integrated antenna 31, such that there may be more than one antenna per tank 10.

It is contemplated to share one of the readers 30 or 40 among multiple tanks 10. As an example, the antenna 31 may be permanently received in the tank 10 with a reader 30 sharing multiple antennae. It is contemplated to connect/disconnect the reader 30 from the antenna 31 as required.

According to a method of performing wireless identification of samples in liquid nitrogen storage, an identification of a wireless tag 20 is associated with an identification of a sample 16, for instance in a database of a processor unit, log book, etc. As the sample 16 with the wireless tag 20 is inserted in a tank, the wireless communication between tag 20 and reader 30/40 allows the identification of the sample 16. This may, for example, be done by way of the antenna 31 detecting the presence of the wireless tag 20 therein, which wireless tag 20 has an identification corresponding to the sample identification in the processor unit 32/41. However, the reader 30/40 may be in a latent mode, and if a reading is required, the reader 30/40 may emit and/or receive a signal from the wireless tag 20, which signal will be representative of an identification that the reader 30/40 can provide. If necessary, this information is run against a database of the processor unit 32/41 so as to provide an identification of a sample identification related to the wireless tag 20. In an embodiment, the reader 40 is brought in close proximity to the window 18 of the tank 10 so as to obtain the reading. In the example in which the wireless identification is done by NFC, both the wireless tags 20 and readers 30 or 40 have appropriate chips for near field communication therebetween. The use of the internal antenna 31 does not preclude the use of both a fixed reader on the tank and an external mobile reader for more thorough search.

As mentioned previously, other configurations of cryogenic liquid tanks may be used with the system of the present disclosure, such as when samples are stored in cryogenic boxes placed in racks which are placed inside the tank 10. Various types of racks and sample holding accessories are commercially available and may be used with the system of the present disclosure. Accordingly, the present disclosure covers all types of dewars, sample storage methods and accessories designed for cryogenic liquid storage, such as in liquid nitrogen, liquid helium, etc.

The invention claimed is:

1. A system for wireless identification of samples in a tank holding cryogenic liquid in cryogenic liquid storage comprising:
    at least one wireless tag adapted to be connected to a container of the sample in the cryogenic liquid, the at least one wireless tag having an identification associated to the sample in the container and emitting wireless signal while in the cryogenic liquid; and
    a wireless reader adapted to be located outside of the tank and operable to obtain and output the identification of the at least one wireless tag via wireless communication and through the cryogenic liquid.

2. The system according to claim 1, further comprising an antenna having a portion adapted to be immersed in the cryogenic liquid or in the tank, the antenna being connected to the wireless reader.

3. The system according to claim 1, wherein the at least one wireless tag is one of an active wireless tag, battery-assisted passive wireless tag, and passive wireless tag.

4. The system according to claim 1, wherein the at least one wireless tag and the wireless reader are radio-frequency enabled.

5. The system according to claim 4, wherein the at least one wireless tag and the wireless reader operate at ultra-high frequency or high frequency.

6. The system according to claim 1, further comprising a processing unit for obtaining an identity of the sample from the identification of the at least one wireless tag.

7. The system according to claim 1, wherein the at least one wireless tag and the wireless reader are near-field communication enabled.

8. The system according to claim 1, wherein the at least one wireless tag and the wireless reader is on a label.

9. The system according to claim 1, further comprising the tank adapted to receive samples and the cryogenic liquid in its inner cavity.

10. The system according to claim 9, wherein an outer wall of the tank has a non-metallic window, the wireless reader communicating with the at least one wireless tag through the non-metallic window.

11. A method of wireless identification of samples in cryogenic liquid storage comprising:
    emitting at least one wireless signal for same to travel through a cryogenic liquid in a cryogenic storage tank, with at least one wireless tag in the cryogenic liquid;
    wirelessly receiving the wireless signal after it has travelled through the cryogenic liquid; and
    identifying a sample associated to the radio frequency signal.

12. The method according to claim 11, wherein emitting the wireless signal and wirelessly receiving the wireless signal are performed using one of radio frequency and near field communication.

13. The method according to claim 11, wherein emitting the wireless signal and wirelessly receiving the wireless signal are performed at least at high frequency or ultra-high frequency.

14. The method according to claim 11, wherein wirelessly receiving the wireless signal includes receiving the wireless signal from an antenna.

15. The method according to claim 11, wherein emitting the wireless signal includes emitting the wireless signal from an active wireless tag, battery-assisted passive wireless tag, and passive wireless tag.

16. The method according to claim 11, wherein wirelessly receiving the wireless signal includes receiving the wireless signal through a non-metallic window in the tank.

\* \* \* \* \*